Patented Jan. 9, 1923.

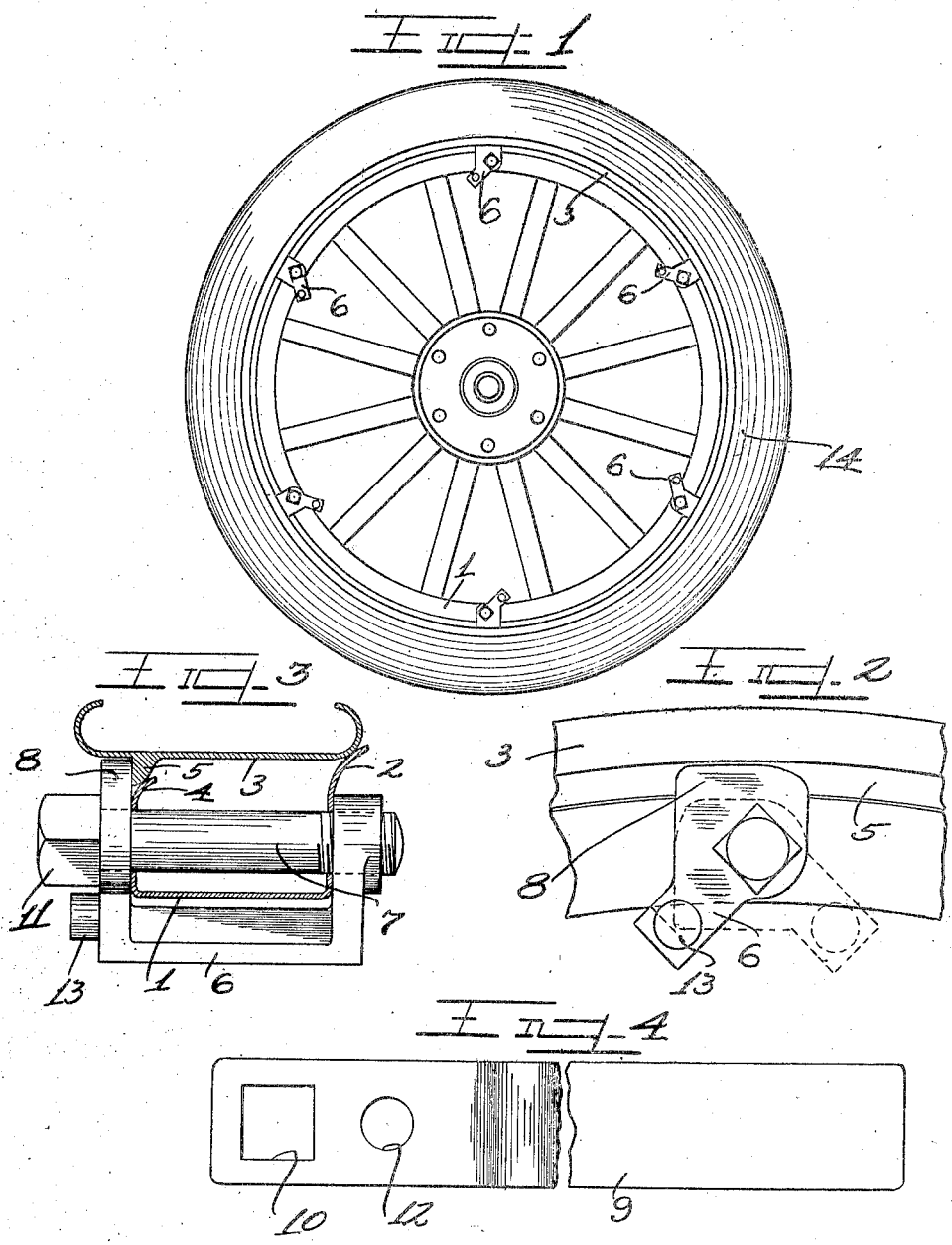

1,441,657

UNITED STATES PATENT OFFICE.

CLEMENT G. BRANSTRATOR, OF BUSHNELL, ILLINOIS.

QUICK-RELEASABLE DEVICE FOR DEMOUNTABLE RIMS.

Application filed October 22, 1920. Serial No. 418,638.

*To all whom it may concern:*

Be it known that I, CLEMENT G. BRANSTRATOR, a citizen of the United States, and a resident of the city of Bushnell, in the county of McDonough and State of Illinois, have invented certain new and useful Improvements in a Quick-Releasable Device for Demountable Rims; and I do hereby declare that the following is a full, clear, and exact description of the same, reference being had to the accompanying drawings, and to the numerals of reference marked thereon, which form a part of this specification.

My invention relates to a demountable rim structure and comprises quickly releasable means for holding said rim in position. In the past, it has been customary to hold the rim by means of lugs which were supported by a screw which had to be removed, or else the lugs were provided with slots and would drop down upon loosening the holding screw. These operations require considerable time and effort, and are not very satisfactory. My invention is designed to overcome this objection.

It is therefore an object of this invention to provide a quickly releasable device for a demountable rim.

It is a further object of this invention to provide a demountable rim structure that is readily applicable to my releasable device.

Other objects will be apparent from the following description and disclosure.

In the drawings:

Figure 1 is a side elevation of a wheel illustrating my invention as applied thereto.

Figure 2 is a fragmentary elevational view of a portion of a wheel on an enlarged scale showing the operative and inoperative positions of my lug.

Figure 3 is a section through a demountable rim showing my securing clip or lug in elevation.

Figure 4 is a plan view of a wrench used in connection with my clips.

In referring to the different figures of the drawing in which similar features are denoted by similar reference numerals, it will be observed that I have illustrated a demountable rim structure which is designed so that the rim may be easily slipped over the felly and my device quickly adjusted into position. It is to be understood that while I have illustrated a certain rim and felly, the same may be varied and modified. It is merely contemplated that such structure shall be designed to permit the operation and use of a quickly releasable device which constitute the main features of my invention.

In accordance with the foregoing, my invention contemplates the use of a felly 1 having a rim retaining flange or member 2 so designed as to afford a supporting abutment for one edge of the rim 3. The opposite side of the felly is provided with a shorter flange member 4 designed to allow the rim to slip thereover, and to also cooperate with said rim for properly supporting the same.

In the present embodiment of my invention, I have illustrated a clincher rim 3 having the usual curved flanges for securing the tire thereon, and provided with a downwardly projecting flange or ridge 5 designed to cooperate upon one side with the shorter flange 4 of the felly 1 for supporting the rim in place. The opposite or outer side of the flange or ridge 5 is designed to cooperate with my quickly releasable devices whereby the rim 3 and tire supported thereby are retained in operative position on the felly.

Each of my devices as exemplified in the present embodiment thereof consists preferably of a U-shaped member 6 designed to straddle the felly 1 from the bottom thereof as shown in Figure 3, and to be secured thereto by means of a screw or pivot 7 which enters an aperture in the outer leg of the member 6, passes through proper holes in the flanges of the felly and is screwthreaded into the inner leg of the U-member 6; the outer leg of the U-shaped member 6 projects above the supporting screw or pivot 7 to provide a rim securing lug 8 designed to be moved into or out of contact with the flange or ridge 5 for either securing or releasing the rim 3 in relation to the felly. The forward end of the lug 8 is bevelled or curved and of such dimensions as to clear the rim 3 during the operation of the device 6 and to allow the rim 3 to be removed, as is apparent and it is contemplated that the U-shaped member 6 should be sufficiently resilient so that the bridging portion of the legs may bend or give sufficiently to firmly clamp and press the felly 1. The device is adapted to be swung from the position shown in full lines in Figure 2 to the position shown in dotted lines. In the latter position the lug 8 will have been removed from contact with the flange 5 so that the rim 3 may be removed from the felly.

In order to shift or adjust the device, a wrench 9 has been provided. The wrench has a polygonal aperture 10 that fits the polygonal head 11 of the pivot 7, and a second aperture 12 designed to fit the lug 13 on the device. These devices are applied at suitable intervals around the felly. In Figure 1, I have shown six in use but their number and spacing may be varied as good practice may dictate. It should be particularly noted that the bridging portion and lug 13 are offset in an oblique direction from the pivot 7 and from a vertical central plane through the lug 8 whereby the U-shaped member 6 will press against the felly in both the operative and inoperative position thereof and the wrench can be more readily applied and operated and a longer swing secured.

Operation.

Assuming that a tire is to be replaced on the wheel 14 equipped with devices embodying my invention, it will only be necessary to take the wrench 9 and apply it to each device in turn and swing the same from operative to inoperative position, or from the full line position shown in Figure 2 to the dotted line position thereof. The tire and rim 3 may then be readily slipped off. In replacing the same, the tire and rim are slipped over the felly and into position thereon, after which the devices 6 may be moved to operative position when the lugs 8 engage against the outer surface of the flange 5 to lock the rim and tire in position on the felly.

It will therefore be apparent that I have invented a demountable rim structure embodying a quick release which can be readily shifted from operative to inoperative position without the loss or waste of time, and that is easily manipulated, requiring but little effort.

I am aware that numerous details of construction may be varied through a wide range without departing from the principles of this invention, and I therefore do not purpose limiting the patent granted otherwise than necessitated by the prior art.

I claim as my invention:

1. In a demountable rim structure, the combination with a rim having a downwardly projecting flange on its inner periphery, of a felly having a retaining flange upon one side adapted to receive the tire rim in abutting relation therewith, pivots having heads at their outer ends extending through said felly, and swingable lugs mounted upon said pivots adapted for engagement with said flange, said lugs having offset wrench receiving lugs.

2. In a demountable rim structure, a felly having a retaining flange upon one side, a rim adapted to be slipped over said felly into abutting relation with said flange, said rim having a depending flange, lugs pivoted to said felly and adapted to be swung in abutting relation with said depending flange, said lugs having portions straddling said felly in offset relation to a central plane through said lugs.

3. In a demountable rim structure, a felly having a retaining flange upon one side, a rim adapted to be slipped over said felly into abutting relation with said flange, U-shaped lugs straddling said felly and pivoted thereto, and adapted to be swung into engagement with said rim, the felly straddling portions of said lugs being offset and provided with wrench reciving lugs.

In testimony whereof I have hereunto subscribed my name in the presence of two subscribing witnesses.

CLEMENT G. BRANSTRATOR.

Witnesses:
PAUL M. BRADBURY,
JAS. GARRITSON.